United States Patent [19]

Amano

[11] Patent Number: 5,615,911
[45] Date of Patent: Apr. 1, 1997

[54] MECHANICAL IGNITION SENSOR

[75] Inventor: Hiroatsu Amano, Aichi-ken, Japan

[73] Assignee: Kabushiki Kaisha Tokai-Rika-Denki-Seisakusho, Aichi-ken, Japan

[21] Appl. No.: 504,315

[22] Filed: Jul. 20, 1995

[30] Foreign Application Priority Data

Aug. 1, 1994 [JP] Japan ..................... 6-180086

[51] Int. Cl.⁶ .................................................. B60R 21/32
[52] U.S. Cl. .................. 280/734; 280/737; 200/61.45 R; 102/274
[58] Field of Search ..................... 280/734, 735, 280/737, 806; 200/61.45 R; 102/274, 272, 275.11

[56] References Cited

U.S. PATENT DOCUMENTS

| | | | |
|---|---|---|---|
| 4,889,068 | 12/1989 | Tabata et al. | 102/274 |
| 4,955,638 | 9/1990 | Kinoshita et al. | 280/734 X |
| 5,386,774 | 2/1995 | Yamamoto et al. | 280/734 X |
| 5,415,099 | 5/1995 | Kitazawa et al. | 102/274 |

FOREIGN PATENT DOCUMENTS

| | | | |
|---|---|---|---|
| 0452521 | 10/1991 | European Pat. Off. | 280/734 |
| 1117949 | 6/1968 | United Kingdom | 102/274 |

*Primary Examiner*—Christopher P. Ellis
*Attorney, Agent, or Firm*—Sixbey Friedman Leedom & Ferguson; Thomas W. Cole

[57] ABSTRACT

A mechanical ignition sensor which can reduce rotational resistance of a trigger lever. An inner periphery of a slit on the side of a spring is formed into an inclined surface which is an abutment surface with an outer peripheral side of the slit opened. An inclined surface of a slide holding portion is formed as a curved surface along a locus of rotation of an abutment leading end portion of the slide holding portion. An angle of inclination α 1 of an abutment leading end P of an inertial mass body with respect to an axial direction of the mechanical ignition sensor is set small such that only the abutment leading end P abuts against the inclined surface of the slide holding portion. As a result, sliding resistance between the inclined surface of the slit and the inclined surface of the slide holding portion. Further, an end portion of the spring is inserted into a ring groove having a semi-circular cross-sectional configuration, formed at a transverse-directional central portion of an end surface of the inertial mass body.

20 Claims, 8 Drawing Sheets

MECHANICAL IGNITION SENSOR

BACKGROUND OF THE INVENTION

1. Field of the Invention

The present invention relates to a mechanical ignition sensor which senses a state of a sudden deceleration of a vehicle so as to actuate an ignitor member.

2. Description of the Related Art

For example, an air bag device equipped on a vehicle is provided with a gas generator having a mechanical ignition sensor. When a vehicle is brought into a state of a sudden deceleration, this state is sensed by the mechanical ignition sensor and the gas generator operates and instantaneously generates gas so as to inflate an air bag body within the air bag device.

As shown in FIG. 8, a mechanical ignition sensor 100 used in the air bag device as described above is basically formed from an ignition pin 104 for igniting an ignitor 102, an inertial mass body 106 inertially moving by a rapid deceleration, and a trigger lever 108 interposed between the ignition pin 104 and the inertial mass body 106 so as to prevent movement of the ignition pin 104.

The trigger lever 108 is usually in a state in which an engaging portion 108A engages with the inertial mass body 106. When the inertial mass body 106 moves in an upper direction in FIG. 8 (i.e., the direction indicated by arrow F in FIG. 8), the engaging portion 108A enters a slit 110 formed in the inertial mass body 106 and rotates around a shaft 112 in a counterclockwise direction in FIG. 8 (i.e., the direction indicated by arrow R in FIG. 8). As a result, the engaging portion 108A of the trigger lever 108 is released from a state of engaging with the ignition pin 104.

Further, the inertial mass body 106 is urged by a spring 114 in a direction opposite to the direction of arrow F in FIG. 8. When deceleration greater than the urging force of the spring 114 acts on the sensor 100, the inertial mass body 106 starts moving in tile direction indicated by arrow F in FIG. 8.

However, in the above-described mechanical ignition sensor 100, immediately after the engaging portion 108A of the trigger lever 108 starts entering the slit 110 formed in the inertial mass body 106 at the same time when the inertial mass body 106 moves, if a sliding resistance between the engaging portion 108A and the slit 110 increases, a rotational resistance of the trigger lever 108 may increase.

SUMMARY OF THE INVENTION

In view of the above-described circumstances, it is an object of the present invention to provide a mechanical ignition sensor which can lessen rotational resistance of a trigger lever.

In accordance with an aspect of the present invention, there is provided a mechanical ignition sensor comprising: an ignition pin moving in an axial direction of the mechanical ignition sensor to ignite an ignitor member; an inertial mass body moving by not less than predetermined inertial force thereof; and a trigger lever engaging with the ignition pin to hold the ignition pin at a position separated from the ignitor member, when the inertial mass body moves, the trigger lever rotating in a direction of moving away from the ignition pin so that the ignition pin can move, wherein, in a portion in which the inertial mass body and the trigger lever abut each other, an abutment surface of the trigger lever is formed as a curved surface along a locus of rotation of a leading end portion of the abutment surface, and an angle of inclination of an abutment leading end of the inertial mass body with respect to the axial direction is set small such that only the abutment leading end of the inertial mass body abuts against the abutment surface of the trigger lever.

In the present invention, the ignition pin is usually positioned separated from the ignitor member and the inertial mass body enters a locus of rotation of the trigger lever. Moreover, the trigger lever is constructed in that tile engaging portion thereof engages with and holds the ignition pin and stops rotating by the inertial mass body to maintain a state of holding the ignition pin. In this state, when a rapid deceleration acts on the mechanical ignition sensor, the inertial mass body moves inertially and is separated from the locus of rotation of the trigger lever. As a result, the trigger lever is released from a state of being held by the inertial mass body and rotates in a direction of moving away from the ignition pin.

In the above-described aspect of the present invention, in a portion in which the inertial mass body and the trigger lever abut each other, the abutment surface of the trigger lever is formed as a curved surface along a locus of rotation of the leading end portion of the abutment surface, and an angle of inclination of the abutment leading end of the inertial mass body with respect to the axial direction is set small such that only the abutment leading end of the inertial mass body abuts against the abutment surface of the trigger lever. As a result, sliding resistance in the portion in which the inertial mass body and the trigger lever abut each other can be reduced and rotational resistance of the trigger lever can also be reduced. For this reason, the ignition pin is necessarily released from a state of being held by tile engaging portion of the trigger lever and moves in the axial direction to ignite the ignitor member, so that a gas generator is surely actuated. Thus, in the portion where the inertial mass body and the trigger lever abut each other, the abutment surface of the trigger lever is formed as the curved surface along the locus of rotation of the leading end portion of the abutment surface, and the angle of inclination of the abutment leading end of the inertial mass body with respect to the axial direction is set small such that only the abutment leading end of the inertial mass body abuts against the inclined surface of the trigger lever, thereby making it possible to reduce rotational resistance of the trigger lever.

Further, in the present invention, in the portion in which the inertial mass body and the trigger lever abut each other, the angle of inclination of the abutment surface of the inertial mass body with respect to tile axial direction is set larger than the angle of inclination of the abutment surface of the trigger lever with respect to the axial direction. Accordingly, once the abutment surface of the inertial mass body abuts against and is fastened to the abutment surface of the trigger lever, the abutment surface of the inertial mass body slips into the abutment end portion of the trigger lever by force of the inertial mass body for striving to return tile original position and the rotational resistance of the trigger lever can be reduced. For this reason, the ignition pin is necessarily released from a state of being held by the engaging portion of the trigger lever and moves in the axial direction to ignite the ignitor or member, so that the gas generator is surely actuated. Thus, in the portion in which the inertial mass body and the trigger lever abut each other, the angle of inclination of the abutment surface of the inertial mass body with respect to the axial direction is set larger than the angle of inclination of the abutment surface of the trigger lever with respect to the axial direction, thereby making it possible to reduce the rotational resistance of the trigger lever.

Moreover, in the present invention, the urging means is formed to be inserted into the groove of the inertial mass body, which makes it possible to prevent a change of a position where the urging means abuts against the inertial mass body and inclination of the urging means. Accordingly, there is no possibility that pressing force of tile urging means on the inertial mass body varies, and to reduce the rotational resistance of the trigger lever. Thus, since the groove with which the urging means is to engage is formed in the inertial mass body at tile portion where the inertial mass body abuts against the urging means, the rotational resistance of tile trigger lever can be reduced.

DESCRIPTION OF THE PREFERRED EMBODIMENTS

Referring now to FIG. 1 through FIG. 7, a description will be given of an embodiment of a mechanical ignition sensor according to the present invention.

Figure 1:
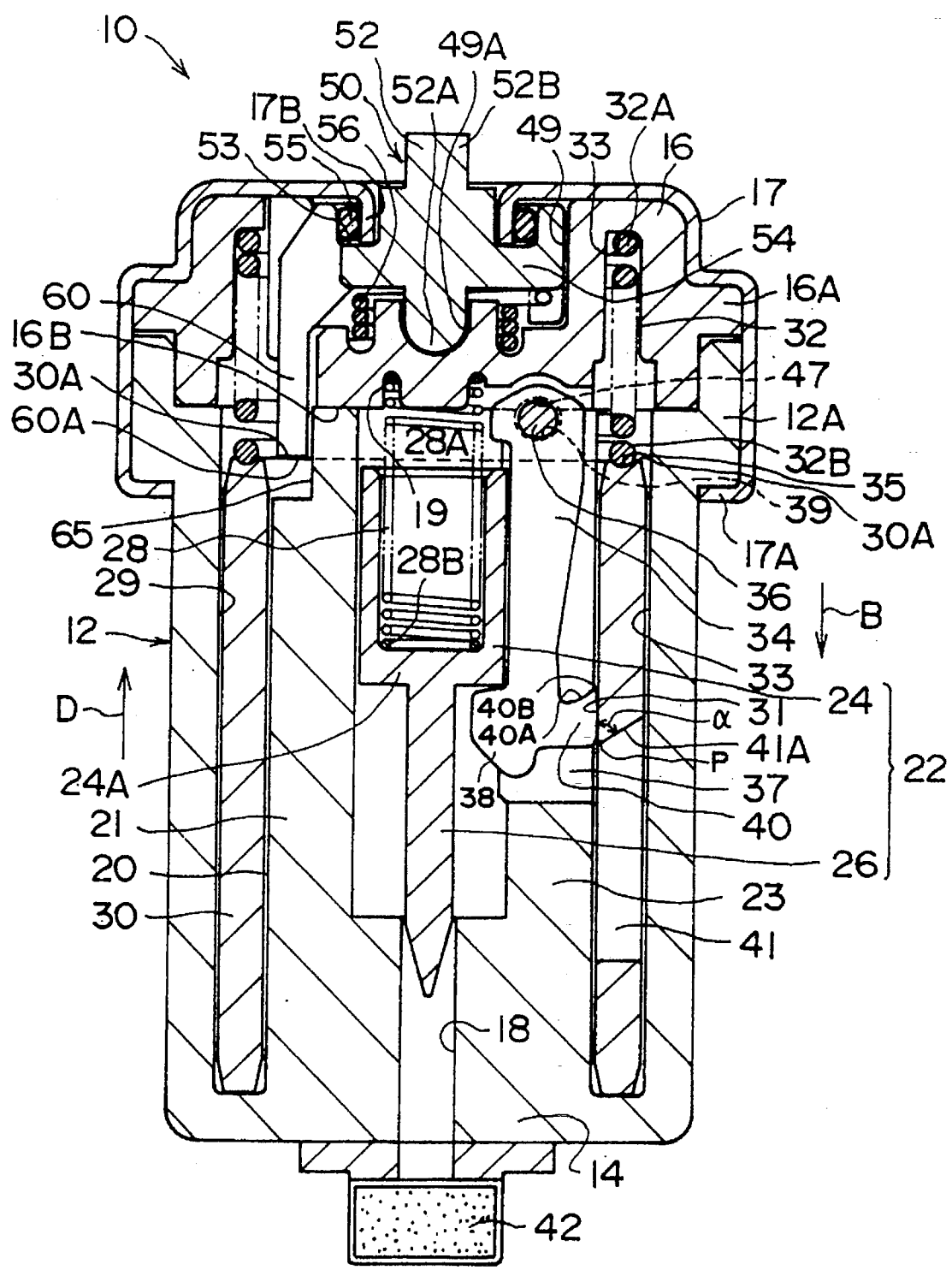
FIG. 1 is a side cross-sectional view illustrating a mechanical ignition sensor according to the present invention.

As shown in FIG. 1, a mechanical ignition sensor 10 has a case 12 which is formed into a cylindrical shape having a bottom wall 14 at one end thereof.

Figure 3:
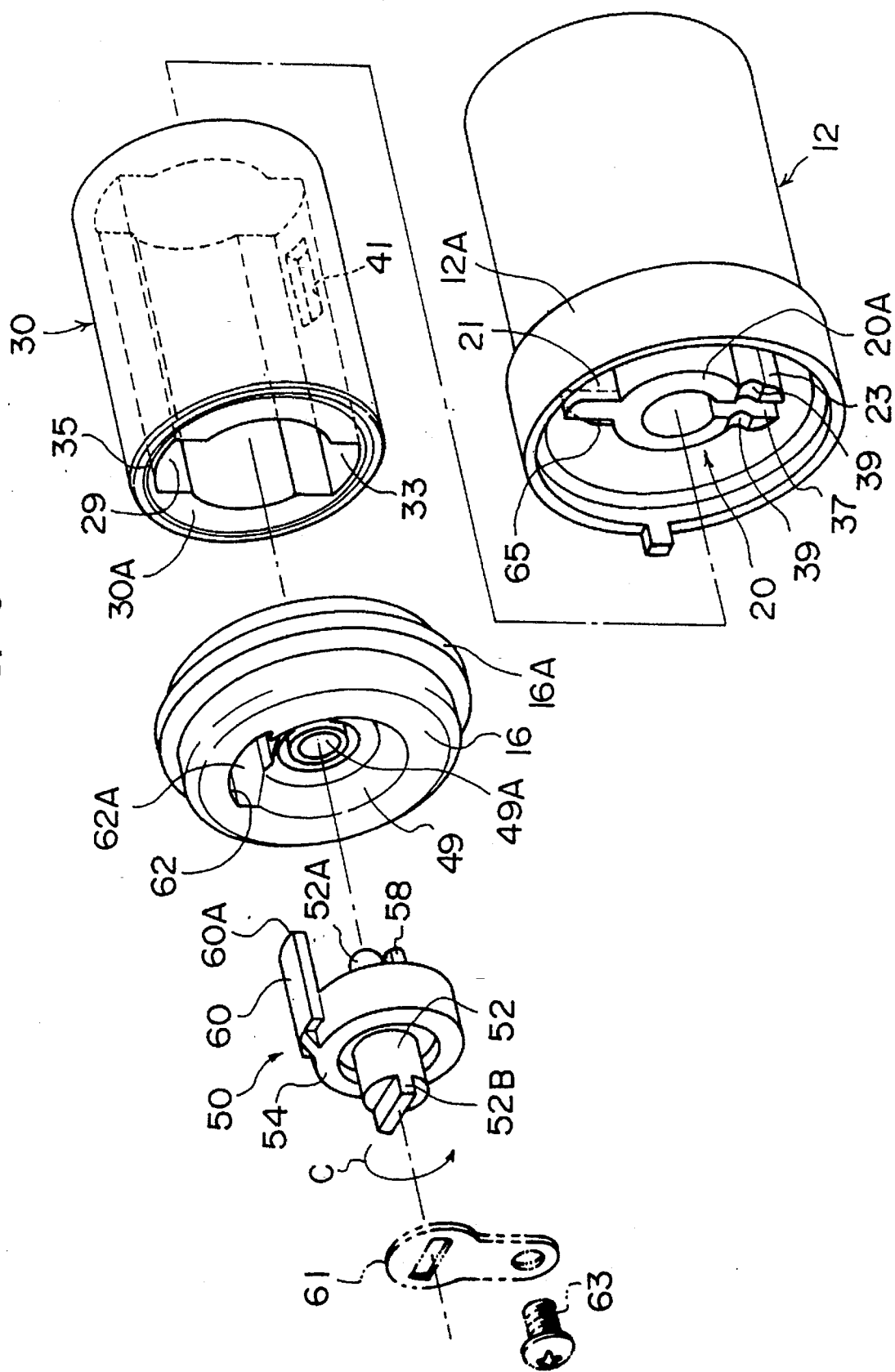
FIG. 3 is an exploded perspective view illustrating a main portion of the mechanical ignition sensor according to the present invention.

As shown in FIG. 3, a ring-shaped convex portion 12A is formed in an open edge portion of the case 12 in such a manner as to project outward in a radial direction of the case 12. An open side of the case 12 is sealed by a bobbin 16. A ring-shaped convex portion 16A is formed in an outer peripheral portion of the bobbin 16 so as to face outward in a radial direction of the bobbin 16. The convex portion 16A abuts against the convex portion 12A of the case 12.

As shown in FIG. 1, the bobbin 16 and the convex portion 12A of the case 12 are covered by a cap 17. An edge portion 17A of the cap 17 is caulked to the convex portion 12A of the case 12 such that the bobbin 16 is fixed to the case 12.

A through hole 18 is formed in the bottom wall 14 of the case 12 on an axial line of the case 12. Further, a substantially cylindrical guide 20 having a pair of projecting portions 21, 23 respectively projecting in a diametral direction of the guide 20 is formed coaxial with the case 12 in such a manner as to project from the bottom wall 14 toward an interior of the case 12.

An ignition pin 22 is disposed within the case 12. The ignition pin 22 is formed from a main body 24 having a substantially cylindrical shape, and a pin-shaped projecting portion 26 formed integrally with and projecting from a bottom wall 24A of the main body 24. An outer diameter portion of the main body 24 is inserted within the guide 20 and the ignition pin 22 is adapted to be slidable within the guide 20 along the axial line.

Meanwhile, the projecting portion 26 projects outward from the through hole 18 formed in the bottom wall 14 in a state in which the ignition pin 22 (i.e., the main body 24) has moved toward the bottom wall 14 of the case 12 as far as it can go.

A firing spring 28 is disposed between the bobbin 16 and the ignition pin 22 and constantly urges the ignition pin 22 in the direction of the through hole 18. It should be noted that one end portion 28A of the firing spring 28 is inserted into a ring-shaped concave portion 19 formed on the bottom surface 16B of the bobbin 16 and another end portion 28B of the firing spring 28 is inserted within the main body 24 of the ignition pin 22. Meanwhile, an inertial mass body 30 is disposed around the guide 20.

As shown in FIG. 3, the inertial mass body 30 is formed into a substantially cylindrical shape, in which concave portions 29, 33 into which the projecting portions 21, 23 of the guide 20 are respectively inserted are provided along an axial direction of the inertial mass body 30. The inertial mass body 30 is accommodated within the case 12 in such a manner as to be capable of moving between an inner peripheral wall of the case 12 and the guide 20.

As shown in FIG. 1, a spring 32 is interposed between the inertial mass body 30 and the bobbin 16 and constantly urges the inertial mass body 30 toward the bottom wall 14. It should be noted that one end portion 32A of the spring 32 is inserted in a ring-shaped concave portion 33 formed on the bottom surface 16B of the bobbin 16 and another end portion 32B of the spring 32 is inserted in a ring groove 35 having a semicircular cross-sectional configuration, which is formed at a transverse-directional central portion of an end surface 30A of the inertial mass body 30.

A trigger lever 34 is disposed between the inertial mass body 30 and the ignition pin 22 and is inserted into a slit 37 formed in the convex portion 23 of the guide 20 along the axial direction. Further, the trigger lever 34 is constructed in that its one end portion in a longitudinal direction thereof is rotatably supported by a shaft 36 and the shaft 36 engages with a pair of concave portions 39 each having a semicircular cross-sectional configuration, which are formed at an end surface 20A of the guide 20 with the slit 37 interposed therebetween.

As shown in FIG. 1, a pair of concave portions 47 are formed on the bottom surface 16B of the bobbin 16, which faces the pair of concave portions 39. These concave portions 47 together with the concave portions 39 form a bearing portion of the shaft 36.

Further, an engaging portion 38 is formed at a leading end of the trigger lever 34 so as to project toward the ignition pin 22. The engaging portion 38 can engage with the main body 24 of the ignition pin 22. Namely, when the trigger lever 34 rotates around the shaft 36, the engaging portion 38 can move close to or away from the ignition pin 22. In the state in which the engaging portion 38 engages with the main body 24 of the ignition pin 22, the engaging portion 28 holds a leading end portion of the projecting portion 26 of the ignition pin 22 urged by the firing spring 28, at a position near an opening of the through hole 18.

Moreover, a slide holding portion 40 is formed in the vicinity of the leading end portion of the trigger lever 34 on the side opposite to the ignition pin 22 in such a manner as to project toward the inertial mass body 30. The slide holding portion 40 corresponds to a slide portion 31 formed on an inner periphery of the inertial mass body 30 and is adapted to linearly contact the slide portion 31. Usually, the inertial mass body 30 is located at a position where it has moved toward the bottom wall 14 of the case 12 as far as it can go. In this state, the slide portion 31 of the inertial mass body 30 abuts against the slide holding portion 40 of the trigger lever 34 and the engaging portion 38 of the trigger lever 34 engages with the main body 24 of the ignition pin 22. Thus, the ignition pin 22 is brought into a state of being held at a position where the leading end portion of the projecting portion 26 is located in the vicinity of the opening of the through hole 18.

When the inertial mass body 30 moves away from the bottom wall 14, the slide portion 31 of the inertial mass body 30 linearly contacts and moves relatively to the slide holding portion 40 of the trigger lever 34.

A slit 41 which the slide holding portion 40 of the trigger lever 34 can enter is formed along the axial direction in the inertial mass body 30 further toward the bottom wall 14 than the slide portion 31.

Figure 4A:
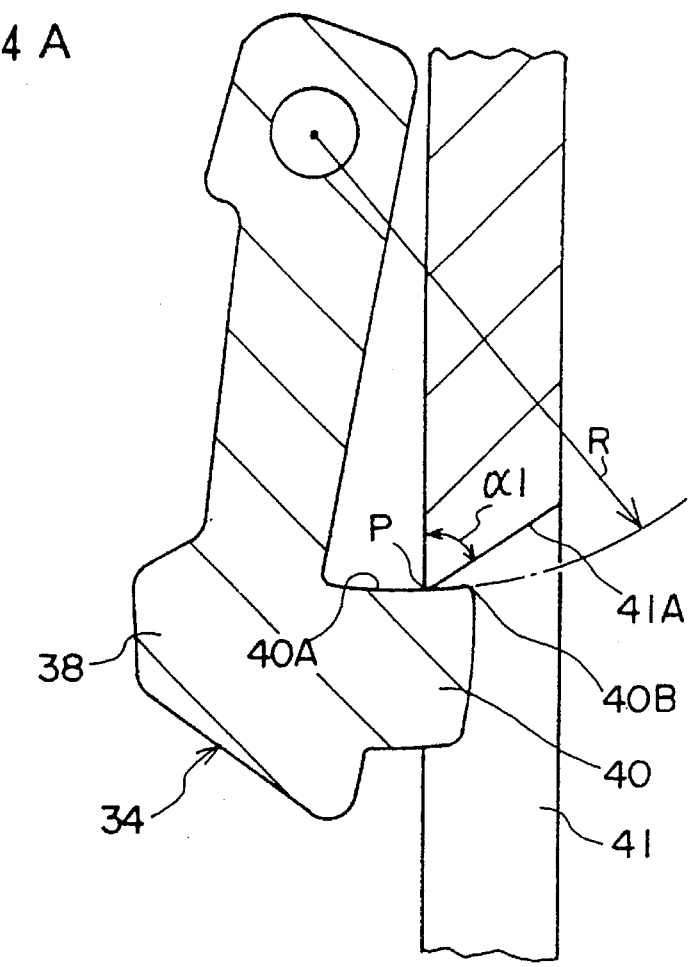
FIG. 4A is a side cross-sectional view illustrating a trigger lever of the mechanical ignition sensor according to the present invention.

As shown in FIG. 4A, an inclined surface 40A of the slide holding portion 40 is formed as a curved surface along a locus of rotation of an abutment leading end portion 40B of the slide holding portion 40 (i.e., along a radius R) and an angle of inclination α 1 of an abutment leading end P of the inertial mass body 30 with respect to the axial direction is set small such that only abutment leading end P abuts against the inclined surface 40A. As a result, sliding resistance between an inclined surface 41A of the inertial mass body 30 and the inclined surface 40A becomes smaller.

Figure 4B:
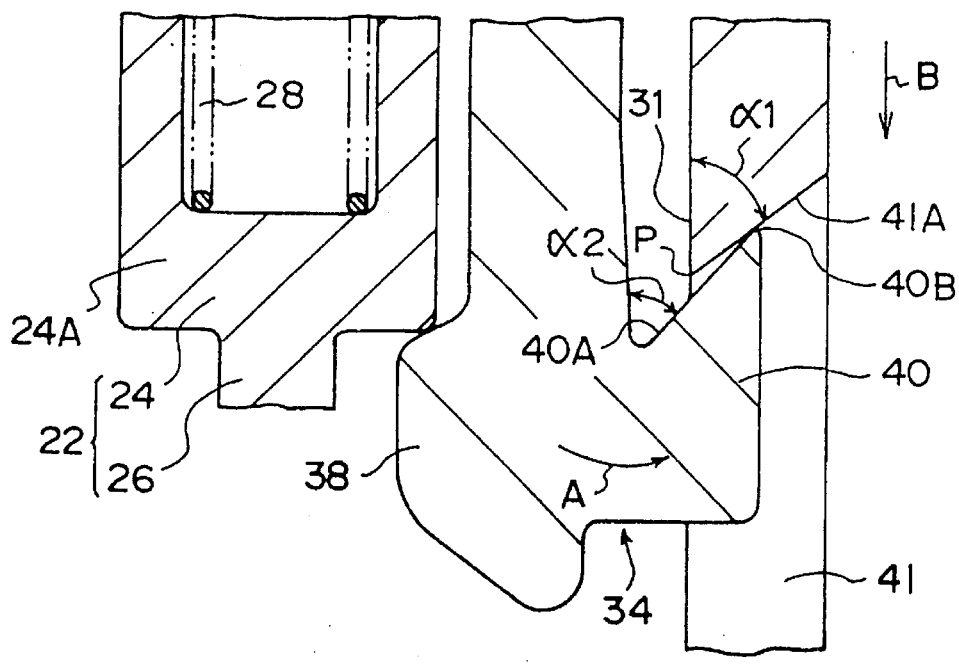
FIG. 4B is a side cross-sectional view illustrating a trigger lever of a mechanical ignition sensor according to another embodiment of the present invention.

Meanwhile, as shown in FIG. 4B, an inner periphery of the slit 41 on the side of the spring 32 is formed as the inclined surface 41A which is an abutment surface with an outer peripheral side of the slit opened. Further, the angle of inclination α 1 of the inclined surface 41A with respect to the axial direction may be set larger than an angle of inclination α 2, with respect to the axial direction, of the inclined surface 40A serving as an abutment surface of the slide holding portion 40 which faces the inclined surface 41A. In this case, when the end portion 40B of the slide holding portion 40 reaches the inclined surface 41A, even when inertial force does not act on the inertial mass body 30 any longer, the inclined surface 41A of the inertial mass body 30 slips into the inclined surface 40A of the slide holding portion 40 by force of the inertial mass body 30 for striving to return the original position (i.e., force acting in the direction indicated by arrow B in FIG. 4B), which is caused by the urging force of the spring 32. As a result, the trigger lever 30 can instantaneously move to the side of an outer circumference.

As shown in FIG. 3, a circular concave portion 49 is formed at a central portion of the bobbin 16 along the axial direction. A safety device 50 is inserted into the concave portion 49. The safety device 50 is constructed in that a leading end portion 52A of a shaft portion 52 is rotatably inserted into a bearing portion 49A formed at a central portion of the concave portion 49.

As shown in FIG. 1, a coil spring 56 is disposed between a flange portion 54 of the safety device 50 and a bottom surface of the concave portion 49. Further, the safety device 50 includes a ring-shaped concave portion 53 formed at an outer peripheral portion of the shaft portion 52. An edge portion 17B of the cap 17 is inserted into the concave portion 53. A seal ring 55 is inserted between the edge portion 17B of the cap 17 and the concave portion 53.

Figure 2:
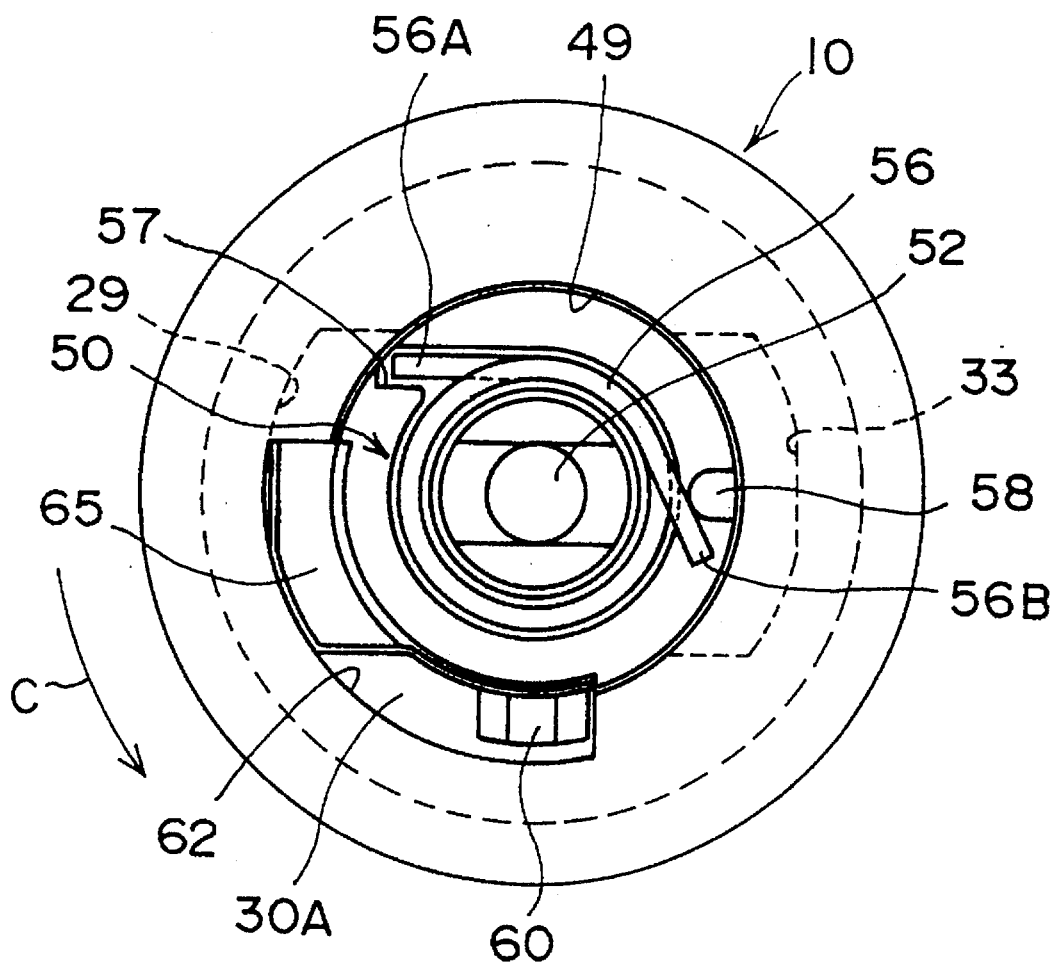
FIG. 2 is a schematic view illustrating the mechanical ignition sensor according to the present invention.

As shown in FIG. 2, one end portion 56A of the coil spring 56 is inserted in a concave portion 57 formed on a bottom surface of the concave portion 49. Another end portion 56B of the coil spring 56 engages with a projecting portion 58 formed on a lower surface of the flange portion 54 of the safety device 50. Thus, the coil spring 56 urges the safety device 50 in a counterclockwise direction in FIG. 2 (i.e., the direction indicated by arrow C in FIG. 2).

As shown in FIG. 3, a stopper 60 is formed at an outer peripheral portion of the flange portion 54 of the safety device 50. The stopper 60 is formed parallel to the shaft portion 52 and reaches an interior of a notch 65 formed at the projecting portion 21 of the guide 20 through a through hole 62 formed in the bobbin 16. The notch 65 faces the through hole 62 and is provided to extend along an outer periphery of the guide 20. Accordingly, the stopper 60 rotates integrally with the safety device 50 within the notch 65 in the direction indicated by arrow C by an urging force of the coil spring 56. Further, in a state in which the stopper 60 has stopped rotating at an end surface 62A of tile through hole 62, a leading end surface 60A of the stopper 60 faces the end surface 30A of the inertial mass body 30. In this state, the inertial mass body 30 can hardly move toward the bobbin 16 (i.e., in the direction indicated by arrow D in FIG. 1).

Meanwhile, a grip portion 52B is formed at a projected end portion of the shaft portion 52 of the safety device 50. When the grip portion 52B is rotated in a direction opposite to that of arrow C, for example, by grip means such as an operating handle 61 shown in FIG. 3, so as to move the stopper 60 to an interior of the notch 65 of the projecting portion 21, i.e., to a position where the stopper 60 can enter the concave portion 29, and the operating handle 61 is fixed to the bobbin 16 by a screw 63 or the like, the safety device 50 can be released from an operating state.

The mechanical ignition sensor 10 having the above-described structure is mounted to, for example, a gas generator (not shown) of an air bag device. The gas generator contains a gas generating material. Further, as shown in FIG. 1, there is also provided an ignitor 42 serving as an ignitor member for igniting and combusting the gas generating material. The ignitor 42 is positioned on the axial line of the mechanical ignition sensor 10 in a state where the mechanical ignition sensor 10 is mounted to the gas generator. In this state, the through hole 18 of the case 12 faces the ignitor 42 and the projecting portion 26 of the ignition pin 22 which can project from the through hole 18 can strike against the ignitor 42.

Next, an operation of the present embodiment will be described.

In the mechanical ignition sensor 10 of this embodiment as described above, usually, as shown in FIG. 1, the ignition pin 22 is positioned apart from the ignitor 42 against the urging force of the firing spring 28 and the trigger lever 34 holds the ignition pin 22 with the engaging portion 38 engaging with the main body 24 of the ignition pin 22. Further, the inertial mass body 30 is moved toward the bottom wall 14 by tile spring 32 as far as it can go, namely, enters the locus of rotation of the trigger lever 34. The slide portion 31 abuts against the slide holding portion 40 of the trigger lever 34 so as to prevent rotation of the trigger lever 34 and to maintain a state in which the ignition pin 22 is held by the trigger lever 34.

Moreover, in the state in which the safety device 50 operates (the sensor is in a state of being not capable of operating), as shown in FIG. 2 as well, the stopper 60 rotates integrally with the safety device 50 within the through hole 62 of the bobbin 16 by the urging force of the coil spring 56 and is set in a state in which the stopper 60 has stopped rotating at the end surface 62A of the through hole 62. At this time, the leading end surface 60A of the stopper 60 of the safety device 50 faces the end surface 30A of the inertial mass body 30, so that the inertial mass body can hardly move toward the bobbin 16 (i.e., in the direction indicated by arrow D in FIG. 1).

Accordingly, in this state, even if a rapid deceleration acts on the mechanical ignition sensor 10, the inertial mass body 30 does not practically move inertially and the trigger lever 34 does not rotate. As a result, the ignition pin 22 is not released from a state of being held by the trigger lever 34.

Figure 5:
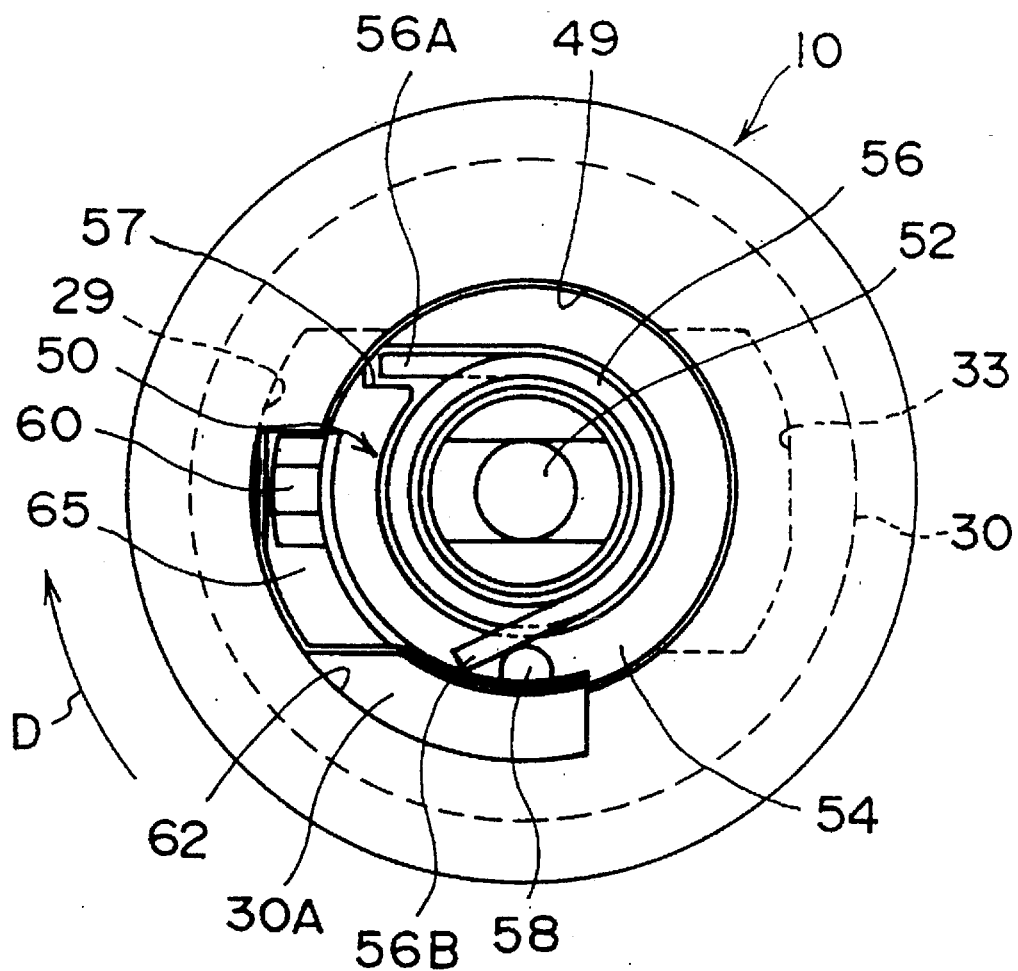
FIG. 5 is a schematic plan view illustrating a state in which a safety device of the mechanical ignition sensor according to the present invention is released.

As shown in FIG. 5, the grip portion 52B (see FIG. 3) of the safety device 50 is gripped by the grip means such as the operating handle 61 and is rotated in the direction indicated by arrow D in FIG. 5, and the stopper 60 is moved to the interior of the notch 65 formed in the projecting portion 21 of the guide 20. Further, the operating handle 61 is fixed. As a result, tile safety device 50 can be released from an operating state.

Figure 6:
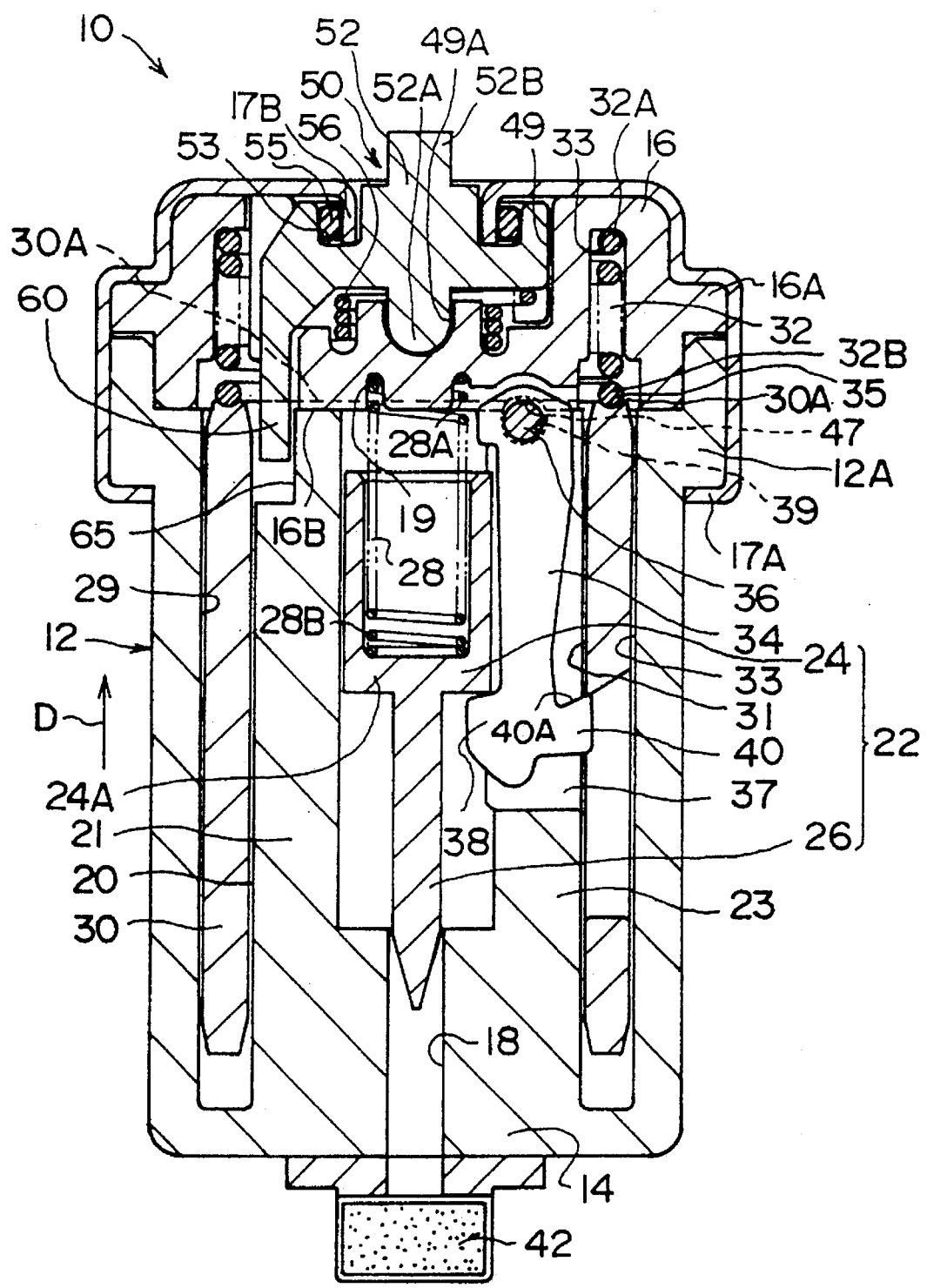
FIG. 6 is a side cross-sectional view illustrating a state in which the mechanical ignition sensor according to the present invention operates.

As shown in FIG. 6, when the safety device 50 is released from the operating state, the stopper 60 is moved away from a locus of movement of the inertial mass body 30. For this reason, the inertial mass body 30 can move toward the bobbin 16 (i.e., in the direction indicated by arrow D in FIG. 6) and the safety device 50 is set in a non-operating state (i.e., the sensor is in a state of being capable of operating).

Here, when a rapid deceleration sensor acts on the mechanical ignition sensor 10, the inertial mass body 30 inertially moves in the direction indicated by arrow D in FIG. 6.

In this case, tile inertial mass body 30 (i.e., the slide portion 31) moves while linearly contacting the slide holding portion 40 of the trigger lever 34. When the slide holding portion 40 of the trigger lever 34 moves away from the slide portion 31 of the inertial mass body 30 and enters tile slit 41 of the inertial mass body 30, the inclined surface 40A of the slide holding portion 40 and the abutment leading end P of the inertial mass body 30 move slidingly on each other. At this time, as shown in FIG. 4A, the inclined surface 40A of the slide holding portion 40 is formed as a curved surface along the locus of rotation of the abutment leading end portion 40B of the slide holding portion 40 (i.e., along the radius R) and the angle of inclination $\alpha$ 1 of the abutment leading end P of the inertial mass body 30 with respect to the axial direction is set small such that only the abutment leading end P abuts against the inclined surface 40A. As a result, sliding resistance between respective abutment portions of the inertial mass body 30 and the trigger lever 34 becomes smaller and rotational resistance of the trigger lever 34 can be reduced.

Figure 7:
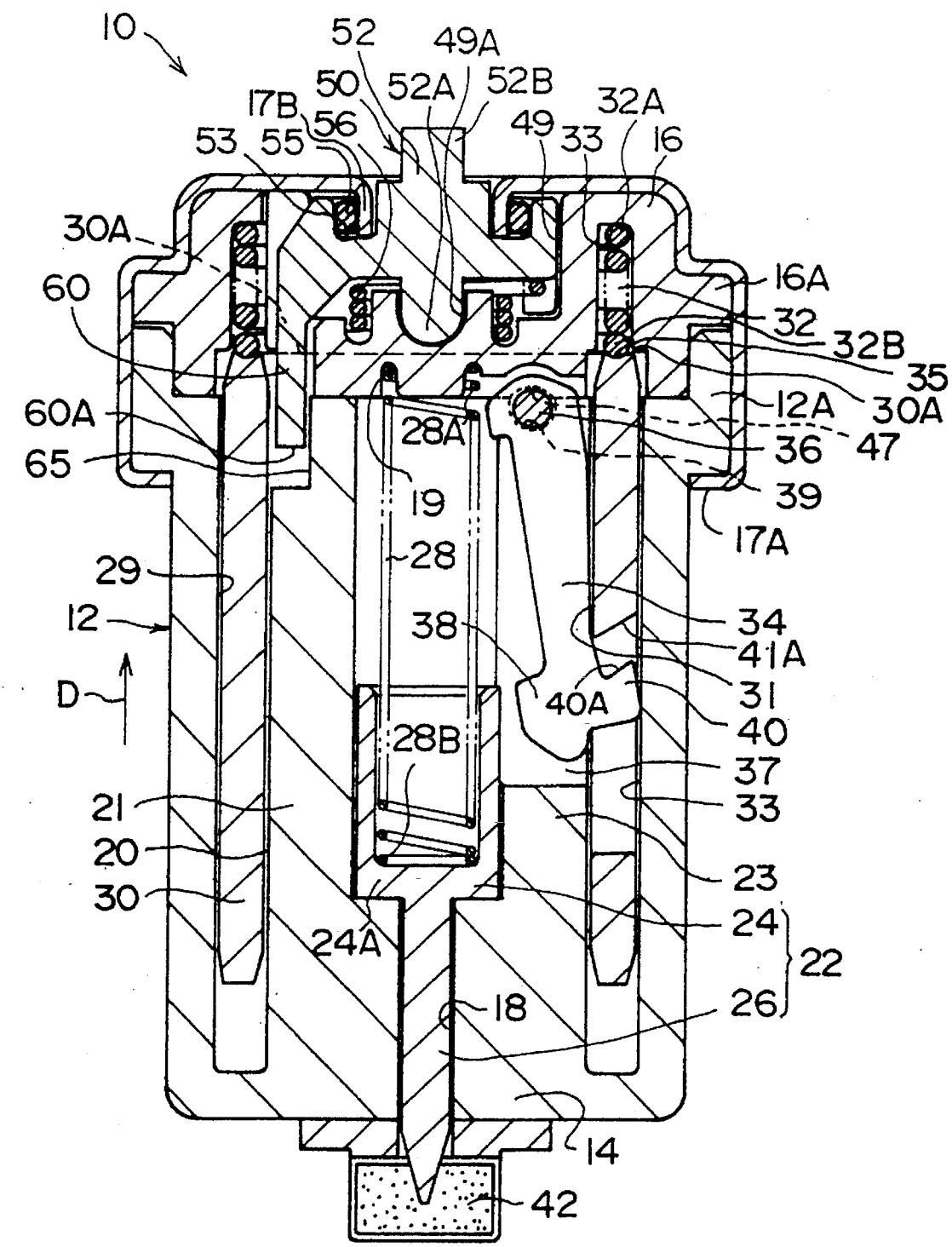
FIG. 7 is a side cross-sectional view illustrating a state after the mechanical ignition sensor according to the present invention has operated.
Figure 8:
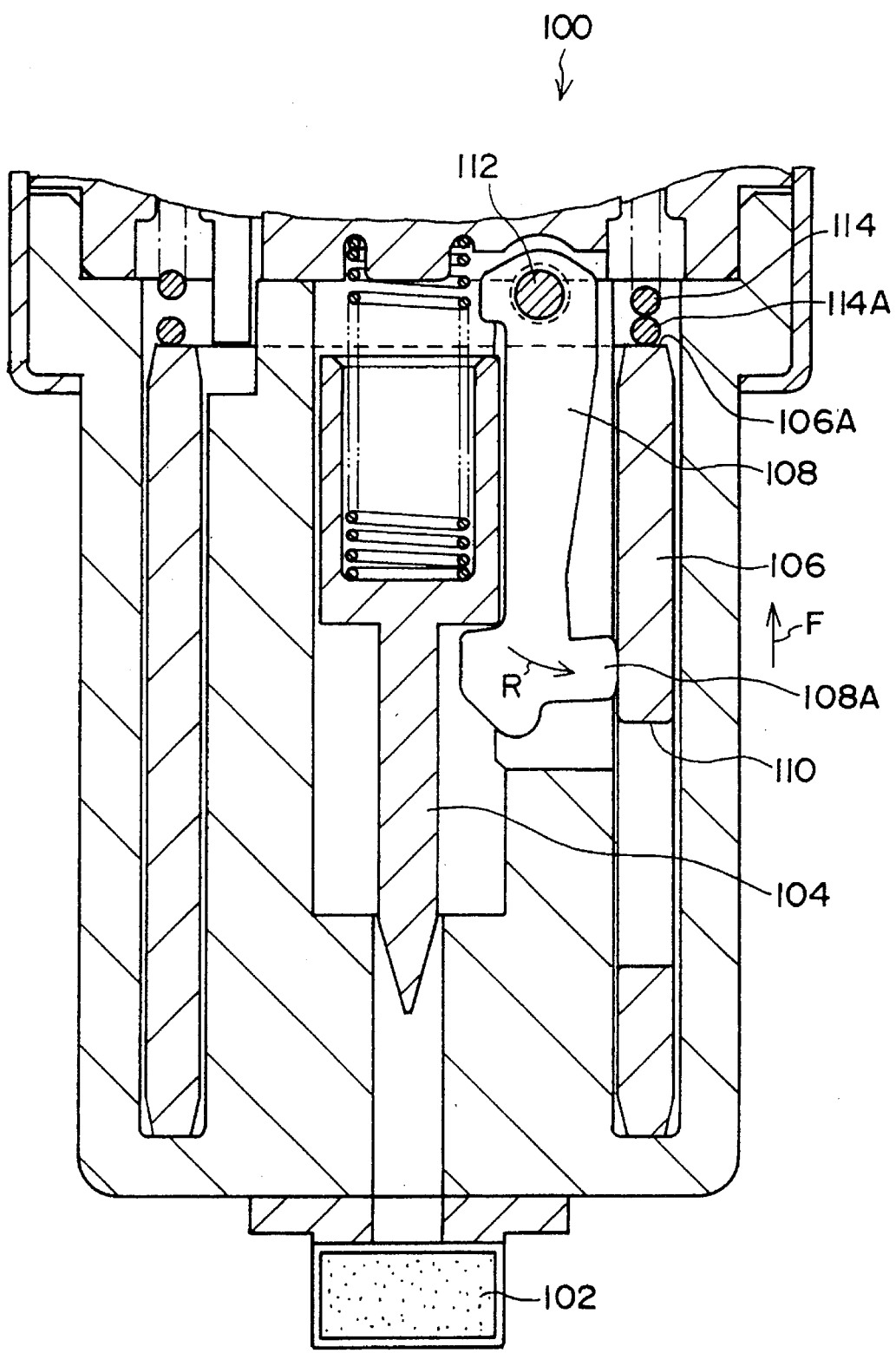
FIG. 8 is a side cross-sectional view illustrating a conventional mechanical ignition sensor.

For this reason, the ignition pin 22 is reliably released from a state of being held by the trigger lever 34 and moves in the axial direction by the urging force of the firing spring 28, so that the projecting portion 26 projects outward from the through hole 18 (see FIG. 7).

As a result, the projecting portion 26 of tile ignition pin 22 strikes against and ignites the ignitor 42. When the ignitor 42 is ignited, tile gas generating material of the gas generator is also ignited and combusts, so that, for example, an air bag device is actuated.

Further, tile mechanical ignition sensor 10 according to the present embodiment is constructed in that movement of the inertial mass body 30 is prevented by the safety device 50. In other words, the safety device 50 is not provided so as to prevent rotation of the trigger lever 34. Thus, when the safety device 50 is released from an operating state, there is no possibility that the inertial mass body 30 is moved to a position where the trigger lever 34 rotates. Accordingly, there is no danger that, at the same time when the safety device 50 is released from an operating state, the trigger lever 34 rotates and the mechanical ignition sensor 10 operates. This makes it possible to prevent the mechanical ignition sensor from operating when the safety device is released from an operating state.

Further, the above-described embodiment is constructed in that the end portion 32B of the spring 32 is inserted into the ring groove 35 having a semicircular cross-sectional configuration which is formed at a transverse-directional central portion of the end surface 30A of the inertial mass body 30. For this reason, the urging force of the spring 32 can reliably be applied to the transverse-directional central portion of the end surface 30A of the inertial mass body 30 in a lower direction in FIG. 1 (i.e., in the direction indicated by arrow B in FIG. 1). Accordingly, there is no possibility that pressing force of the spring 32 on the inertial mass body 30 varies due to mounting failure such as a change and inclination of a position where the spring 32 abuts against the end surface 30A of the inertial mass body 30, and that an acceleration value at the time when the inertial mass body 30 starts moving varies. As a result, the trigger lever 34 rotates along a fixed locus of rotation and rotational resistance of the trigger lever 34 can be reduced.

Further, as shown in FIG. 4B, in a case in which the angle of inclination $\alpha$ 1 of the inclined surface 41A of the slit 41 is set larger than the angle of inclination $\alpha$ 2 of the inclined surface 40A of the guide holding portion 40, when the end portion 40B of the slide holding portion 40 reaches the inclined surface 41A, the trigger lever 34 can swing to instantaneously move to the side of an outer circumference. Accordingly, even when inertial force does not act on the inertial mass body 30 any more while the trigger lever 34 is moving, the inclined surface 41A slips into the end portion 40B of the trigger lever 34 by the urging force of the spring 32 (which acts in the direction indicated by arrow B in FIG. 4B) and the rotational resistance of the trigger lever 34 can be reduced. Thus, the ignition pin 22 can reliably be released from a state of being held by the engaging portion of the trigger lever 34. For this reason, the projecting portion 26 of the ignition pin 22 can reliably strike against the ignitor 42.

Meanwhile, the mechanical ignition sensor 10 of the above-described embodiment is constructed in that the ignition pin 22 is held by one trigger lever 34. However, the number of the trigger lever 34 is not limited to the same, and two or more trigger levers may also be provided.

Further, in the above-described embodiment, the mechanical ignition sensor 10 is used in a gas generator for an air bag device. However, the present invention is not limited to the same, and the mechanical ignition sensor 10 may be used for other apparatuses which operate when the ignition pin 22 strikes against an ignitor or the like, for example, a pretensioner.

What is claimed is:

1. A mechanical ignition sensor comprising:
   an ignition pin moving in an axial direction of said mechanical ignition sensor to ignite an ignitor member;

an inertial mass body moving by not less than a predetermined inertial force thereof; and a trigger lever engaging with said ignition pin to hold said ignition pin at a position separated from the ignitor member, when said inertial mass body moves, said trigger lever rotating in a direction of moving away from said ignition pin so that said ignition pin can move, wherein, in a portion in which said inertial mass body and said trigger lever abut each other, an abutment surface of said trigger lever is formed as a curved surface along a locus of rotation of a leading end portion of the abutment surface, and an angle of inclination of an abutment leading end of said inertial mass body with respect to the axial direction is set small such that only the abutment leading end of said inertial mass body abuts against the abutment surface of said trigger lever.

2. A mechanical ignition sensor according to claim 1, wherein the ignitor member is ignited to generate gas.

3. A mechanical ignition sensor according to claim 1, wherein said inertial force is generated by acceleration at the time of a sudden deceleration of a vehicle.

4. A mechanical ignition sensor according to claim 1, wherein a plurality of trigger levers are provided as said trigger lever.

5. A mechanical ignition sensor according to claim 1, wherein said ignition pin comprises an ignition-pin main body which is urged by urging means for moving said ignition pin in the axial direction to ignite the ignitor member, and wherein, when said trigger lever engages with said ignition-pin main body at the time of normal running of a vehicle, said ignition pin is held at a position separated from the ignitor member.

6. A mechanical ignition sensor according to claim 1, wherein said portion in which said inertial mass body and said trigger lever abut each other is a straight line.

7. A mechanical ignition sensor according to claim 1, wherein the curved surface of the abutment surface of said trigger lever has a fixed radius of curvature.

8. A mechanical ignition sensor according to claim 1, wherein the abutment portion of said inertial mass body is a straight-line surface having an angle of inclination.

9. A mechanical ignition sensor comprising:

an ignition pin moving in an axial direction of said mechanical ignition sensor to ignite an ignitor member;

an inertial mass body moving by not less than a predetermined inertial force thereof; and a trigger lever engaging with said ignition pin to hold said ignition pin at a position separated from the ignitor member, when said inertial mass body moves, said trigger lever rotating in a direction of moving away from said ignition pin so that said ignition pin can move, wherein, in a portion in which said inertial mass body and said trigger lever abut each other, an angle of inclination of an abutment surface of said inertial mass body with respect to the axial direction is set larger than an angle of inclination of an abutment surface of said trigger lever with respect to the axial direction.

10. A mechanical ignition sensor according to claim 9, wherein the ignitor member is ignited to generate gas.

11. A mechanical ignition sensor according to claim 9, wherein said inertial force is generated by acceleration at the time of a sudden deceleration of a vehicle.

12. A mechanical ignition sensor according to claim 9, wherein a plurality of trigger levers are provided as said trigger lever.

13. A mechanical ignition sensor according to claim 9, wherein said ignition pin comprises an ignition-pin main body which is urged by urging means for moving said ignition pin in the axial direction to ignite the ignitor member, and wherein, when said trigger lever engages with said ignition-pin main body at the time of normal running of a vehicle, said ignition pin is held at a position separated from the ignitor member.

14. A mechanical ignition sensor according to claim 9, wherein the abutment portion of said inertial mass body is a straight-line surface having an angle of inclination.

15. A mechanical ignition sensor comprising:

an ignition pin moving in an axial direction of said mechanical ignition sensor to ignite an ignitor member;

an inertial mass body moving by not less than a predetermined inertial force thereof;

urging means for urging said inertial mass body in a direction opposite to a direction in which said inertial mass body moves by the inertial force thereof; and a trigger lever engaging with said ignition pin to hold said ignition pin at a position separated from the ignitor member, when said inertial mass body moves, said trigger lever rotating in a direction of moving away from said ignition pin so that said ignition pin can move, wherein a groove with which said urging means is to engage is formed in said inertial mass body at a position where said inertial mass body abuts against said urging means.

16. A mechanical ignition sensor according to claim 15, wherein the ignitor member is ignited to generate gas.

17. A mechanical ignition sensor according to claim 15, wherein said inertial force is generated by acceleration at the time of a sudden deceleration of a vehicle.

18. A mechanical ignition sensor according to claim 15, wherein a plurality of trigger levers are provided as said trigger lever.

19. A mechanical ignition sensor according to claim 15, wherein said ignition pin comprises an ignition-pin main body which is urged by a second urging means for moving said ignition pin in the axial direction to ignite the ignitor member, and wherein, when said trigger lever engages with said ignition-pin main body at the time of normal running of a vehicle, said ignition pin is held at a position separated from the ignitor member.

20. A mechanical ignition sensor according to claim 15, wherein said urging means urges said inertial mass body such that an inertial force at the time when said inertial mass body starts moving is set at a substantially fixed value.

* * * * *